United States Patent
Urano et al.

(10) Patent No.: US 11,011,812 B2
(45) Date of Patent: May 18, 2021

(54) SECONDARY BATTERY

(71) Applicant: Vehicle Energy Japan Inc., Hitachinaka (JP)

(72) Inventors: Kazuaki Urano, Hitachinaka (JP); Keisuke Sawada, Hitachinaka (JP); Shou Saimaru, Hitachinaka (JP); Naoki Kojima, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 179 days.

(21) Appl. No.: 15/322,746

(22) PCT Filed: Jul. 24, 2014

(86) PCT No.: PCT/JP2014/069595
§ 371 (c)(1),
(2) Date: Dec. 29, 2016

(87) PCT Pub. No.: WO2016/013085
PCT Pub. Date: Jan. 28, 2016

(65) Prior Publication Data
US 2017/0149046 A1    May 25, 2017

(51) Int. Cl.
*H01M 50/578* (2021.01)
*H01M 10/04* (2006.01)
*H01M 50/342* (2021.01)
*H01M 10/0587* (2010.01)

(52) U.S. Cl.
CPC ..... *H01M 50/578* (2021.01); *H01M 10/0431* (2013.01); *H01M 10/0587* (2013.01); *H01M 50/3425* (2021.01); *H01M 2200/20* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,376,120 | B1 | 4/2002 | Azema |
| 2008/0038628 | A1* | 2/2008 | Yamauchi ............... H01M 2/12 |
| | | | 429/56 |
| 2011/0206958 | A1 | 8/2011 | Kiyama et al. |
| 2013/0196187 | A1 | 8/2013 | Yokoyama et al. |
| 2014/0141296 | A1 | 5/2014 | Nakai |
| 2015/0243960 | A1* | 8/2015 | Imanishi ............... H01M 2/345 |
| | | | 429/61 |

FOREIGN PATENT DOCUMENTS

| | | | |
|---|---|---|---|
| CN | 102210041 A | | 10/2011 |
| CN | 103620825 A | | 3/2014 |
| JP | 2000-3702 A | | 1/2000 |
| JP | 2012-119183 A | | 6/2012 |
| JP | 2013-152810 A | | 8/2013 |
| JP | 2013-157137 A | | 8/2013 |
| JP | 2013-157149 A | | 8/2013 |
| JP | 2013-171817 A | | 9/2013 |
| WO | WO 2014064511 | * | 5/2014 |

OTHER PUBLICATIONS

Chinese-language Office Action issued in counterpart Chinese Application No. 201480080423.7 dated Aug. 31, 2018 (six (6) pages).
International Search Report (PCT/ISA/210) issued in PCT Application No. PCT/JP2014/069595 dated Oct. 7, 2014 with English translation (Four (4) pages).
Japanese-language Written Opinion (PCT/ISA/237) issued in PCT Application No. PCT/JP2014/069595 dated Oct. 7, 2014 (Four (4) pages).

* cited by examiner

*Primary Examiner* — Ladan Mohaddes
(74) *Attorney, Agent, or Firm* — Crowell & Moring LLP

(57) ABSTRACT

A secondary battery includes a diaphragm which is disposed on a current path between a current collector plate connected to a wound electrode group in a battery container and an external terminal, deforms when an internal pressure of the battery container increases, and breaks the current path. The diaphragm has a convex portion which protrudes to the current collector plate. The current collector plate has a through-hole into which the convex portion is inserted. An inner wall portion of the through-hole and a side wall portion of the convex portion facing each other are welded.

16 Claims, 14 Drawing Sheets

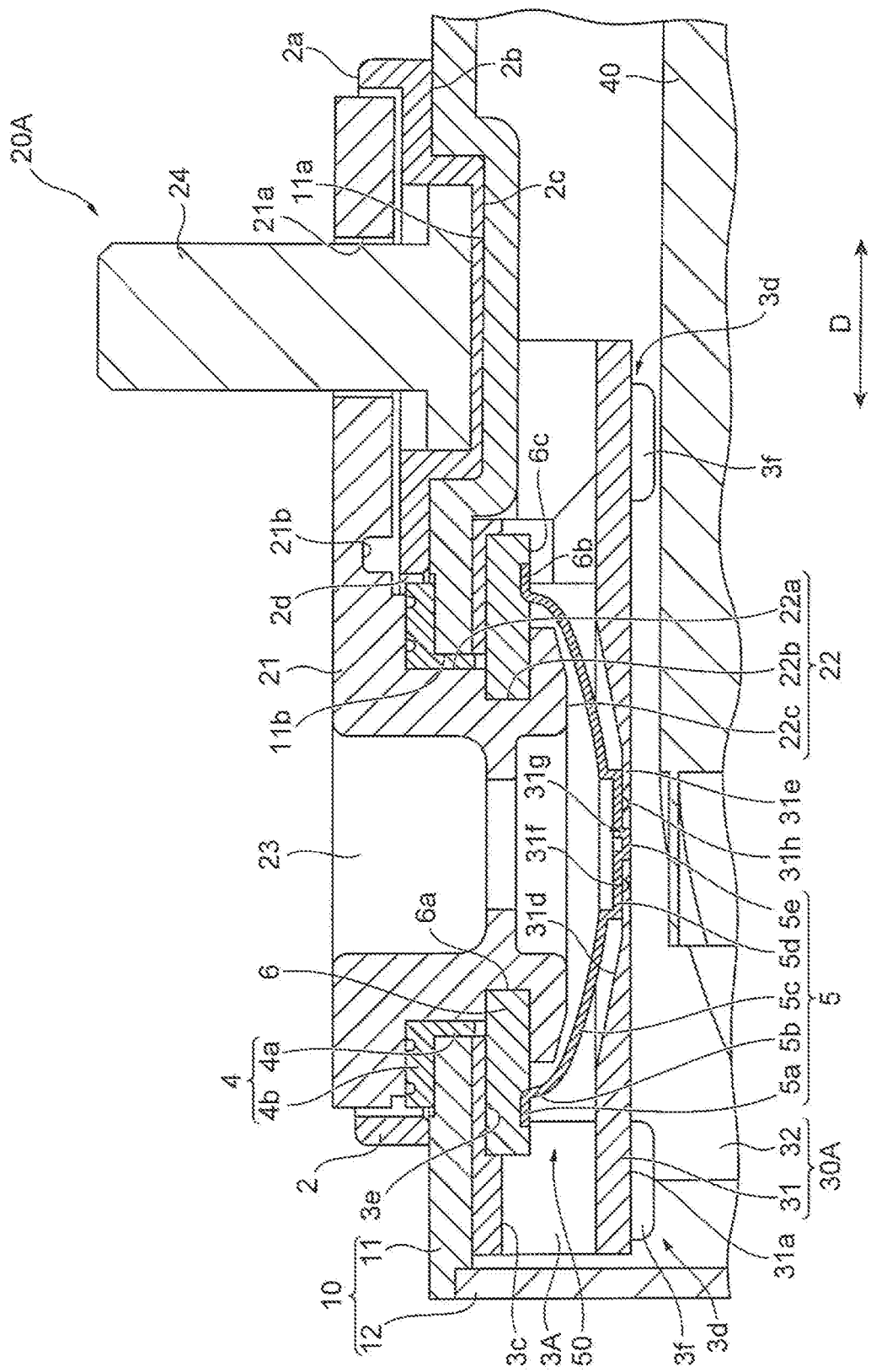

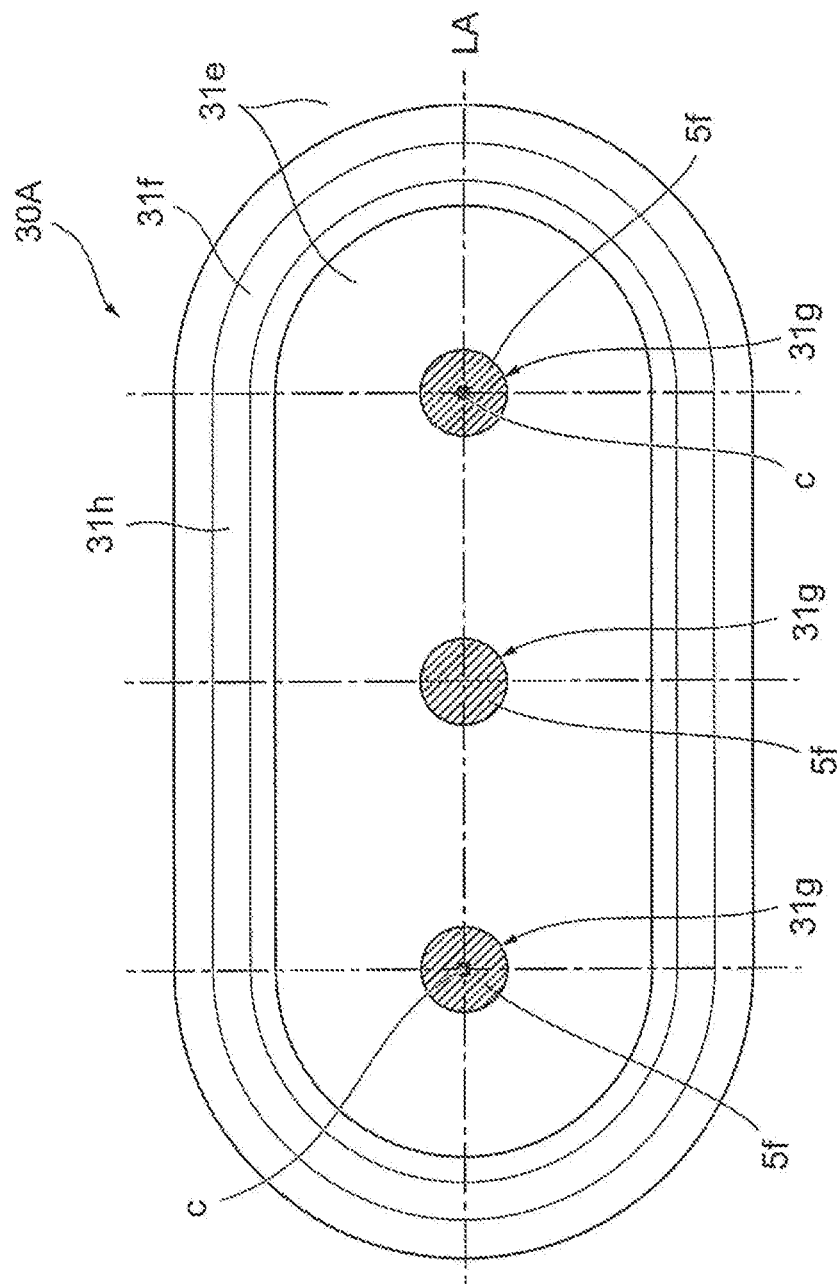

SECONDARY BATTERY

TECHNICAL FIELD

The present invention relates to a secondary battery that is used for a vehicle.

BACKGROUND ART

Conventionally, a secondary battery is used as an on-vehicle power supply to supply power to an electric motor mounted on a vehicle such as an electric vehicle and a hybrid electric vehicle or a power supply of other apparatus. A lithium ion secondary battery having a high energy density attracts attention as the secondary battery and research and development and product commercialization thereof are rapidly advanced. In a sealed lithium ion secondary battery, for example, if gas is generated in the battery due to overcharge or an excessive temperature rise, an internal pressure of the battery may increase.

For example, a non-aqueous electrolyte secondary battery including a current breaking mechanism for breaking electrical connection between an external terminal and an electrode body in an outer casing of the battery when an internal pressure of the outer casing increases is known (refer to PTL 1 described below). In the non-aqueous electrolyte secondary battery described in PTL 1, a hole (16*c*) for connecting portion formation is formed in a center portion of a positive electrode current collector (16), as described in FIGS. 2, 4, and 5 and a paragraph 0050, for example.

In the non-aqueous electrolyte secondary battery described in PTL 1, a portion between an inner wall portion of a convex portion (16*p*) formed annularly in an edge portion of the hole for the connecting portion formation in the positive electrode current collector and an inversion plate (33) is laser-welded at a plurality of places and a connecting portion (16*q*) is formed. In PTL 1, the convex portion is formed in the edge portion of the hole for the connecting portion formation, so that it is easy to weld a lateral surface of the hole for the connecting portion formation and a boundary portion of the inversion plate, and a quality of the connecting portion is stabilized.

CITATION LIST

Patent Literature

PTL 1: JP 2013-157137 A

SUMMARY OF INVENTION

Technical Problem

However, in the non-aqueous electrolyte secondary battery described in PTL 1, the convex portion provided in the edge portion of the hole for the connecting portion formation in the positive electrode current collector and the inversion plate, which are connected by the laser welding, are adjacent to each other in a thickness direction of the positive electrode current collector and overlap each other. When the inner wall portion of the convex portion of the positive electrode current collector is welded to the inversion plate by the laser welding and the connecting portion is formed, laser light is normally radiated from a direction almost perpendicular to the positive electrode current collector. For this reason, a portion of the inversion plate covered with the convex portion of the positive electrode current collector becomes hard to melt at the time of welding. As a result, the quality of the connecting portion may be deteriorated due to occurrence of lack of strength or cracking in the connecting portion formed by the welding.

The present invention has been made in view of the above problems and an object of the present invention is to improve a welding quality between a diaphragm deforming when an internal pressure of a battery container increases and breaking a current path between an external terminal and a current collector plate and the current collector plate.

Solution to Problem

In order to achieve the object, a secondary battery according to the present invention includes a diaphragm which is disposed on a current path between a current collector plate connected to a wound electrode group in a battery container and an external terminal, deforms when an internal pressure of the battery container increases, and breaks the current path, wherein the diaphragm has a convex portion which protrudes to the current collector plate, the current collector plate has a through-hole into which the convex portion is inserted, and an inner wall portion of the through-hole and a side wall portion of the convex portion facing each other are welded.

Advantageous Effects of Invention

In a secondary battery according to the present invention, because an inner wall portion of a through-hole of a current collector plate and a side wall portion of a convex portion of a diaphragm are welded in a facing state, a high energy beam such as laser light is radiated from a direction almost perpendicular to the current collector plate, so that both the inner wall portion of the through-hole and the side wall portion of the convex portion can be melted and can be welded surely. Therefore, according to the secondary battery according to the present invention, a welding quality between the diaphragm and the current collector plate can be improved. Other objects, configurations, and effects will become more apparent from the following description of embodiments.

BRIEF DESCRIPTION OF DRAWINGS

FIG. 4A is an enlarged cross-sectional view of a current breaking unit illustrated in FIG. 2.

FIG. 9C is an enlarged cross-sectional view illustrating a third modification of the secondary battery according to the fourth embodiment, which corresponds to FIG. 8B.

DESCRIPTION OF EMBODIMENTS

Embodiments of a secondary battery according to the present invention are hereinafter described in detail with reference to the drawings.

First Embodiment

Figure 1:
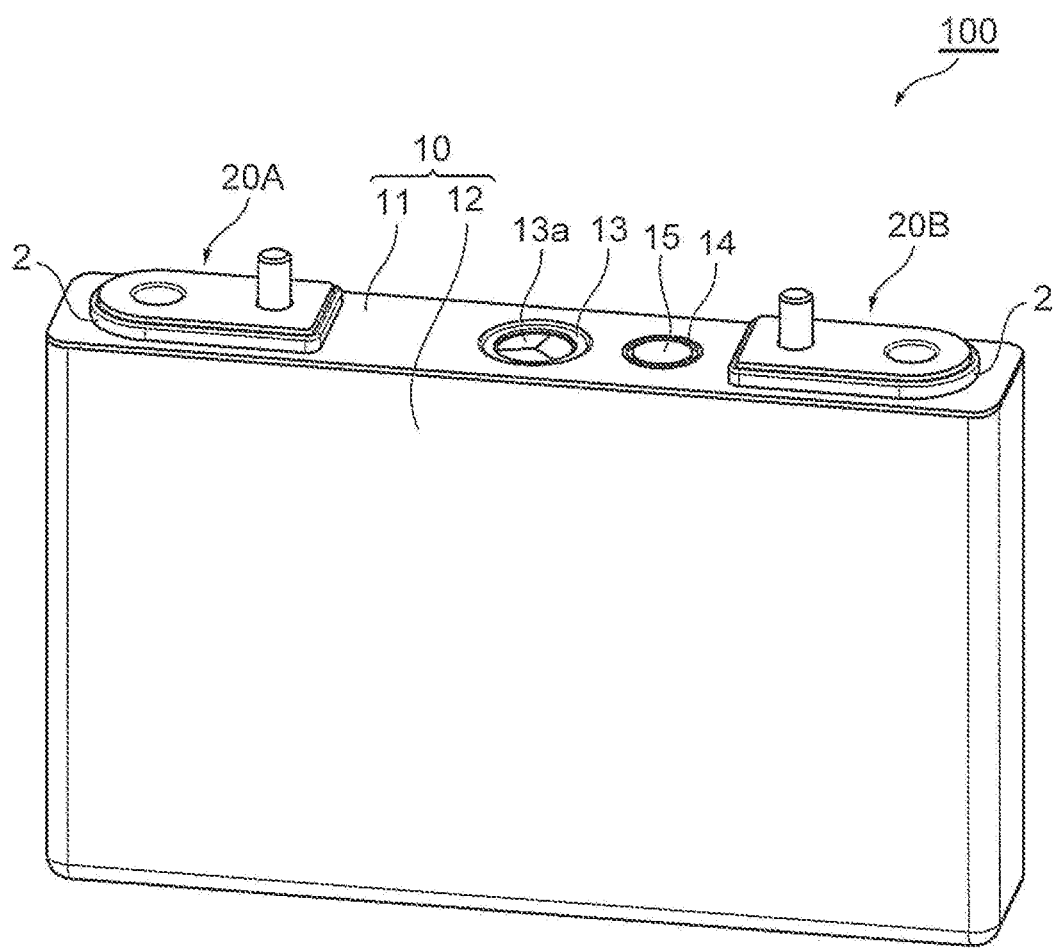
FIG. 1 is a perspective view of a secondary battery according to a first embodiment of the present invention.

FIG. 1 is a perspective view of a secondary battery 100 according to a first embodiment of the present invention. The secondary battery 100 according to this embodiment is a rectangular secondary battery including a battery container 10 of a flat box shape, for example. The battery container 10 includes a flat rectangular battery can 12 that accommodates a flat wound electrode group and a rectangular battery lid 11 that seals the battery can 12. The battery container 10 is manufactured using a metal material such as an aluminum alloy, for example.

Both ends of a width direction of the battery container 10, that is, a longitudinal direction of the battery lid 11 are provided with positive and negative electrode external terminals 20A and 20B, respectively, on a top surface of the battery lid 11 at an outer side of the battery container 10. Insulating members 2 are disposed between the external terminals 20A and 20B and the battery lid 11 and the external terminals 20A and 20B are electrically insulated from the battery lid 11. The positive electrode external terminal 20A is manufactured using aluminum or an aluminum alloy, for example, and the negative electrode external terminal 20B is manufactured using copper or a copper alloy, for example.

A gas discharge valve 13 and a liquid injection hole 14 are provided between the positive and negative electrode external terminals 20A and 20B in the battery lid 11. The gas discharge valve 13 is provided by thinning the battery lid 11 and forming a groove portion 13a. The gas discharge valve 13 cleaves when an internal pressure of the battery container 10 increases to a value more than a predetermined value, discharges internal gas, and decreases the internal pressure of the battery container 10. The liquid injection hole 14 is used to inject an electrolyte into the battery container 10 and is sealed by welding a liquid injection plug 15 by laser welding, for example.

Figure 2:
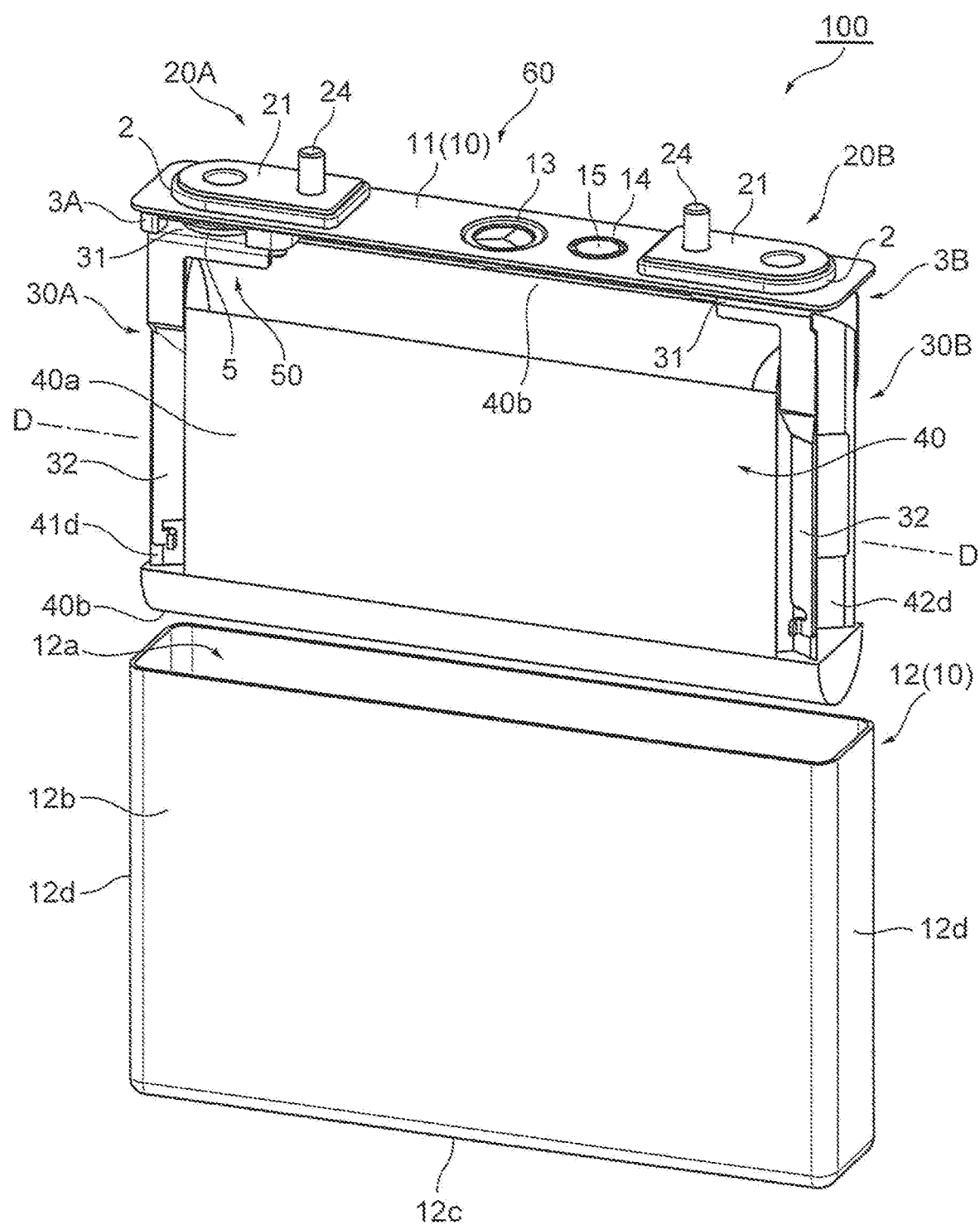
FIG. 2 is an exploded perspective view of the secondary battery illustrated in FIG. 1.

FIG. 2 is an exploded perspective view of the secondary battery 100 illustrated in FIG. 1. At both ends of the longitudinal direction of the battery lid 11, positive electrode and negative electrode current collector plates 30A and 30B are fixed on a bottom surface of the battery lid 11 becoming an inner side of the battery container 10 via insulating members 3A and 3B. The current collector plates 30A and 30B have base portions 31 that are disposed to face the bottom surface of the battery lid 11 via the insulating members 3A and 3B and to be almost parallel to the battery lid 11 and terminal portions 32 that extend from the base portions 31 to a bottom surface 12c of the battery can 12, respectively. The positive electrode current collector plate 30A is manufactured using aluminum or an aluminum alloy, for example, and the negative electrode current collector plate 30B is manufactured using copper or a copper alloy, for example.

The secondary battery 100 includes a current breaking unit 50 that breaks a current path between the positive electrode external terminal 20A and the current collector plate 30A in the battery container 10. The current breaking unit 50 has a diaphragm 5 as a main component. In the secondary battery 100 according to this embodiment, the current breaking unit 50 is not provided between the negative electrode external terminal 20B and the current collector plate 30B.

The diaphragm 5 is disposed on the current path between the positive electrode external terminal 20A and the positive electrode current collector plate 30A connected to an electrode group 40 in the battery container 10. Although described in detail below, the diaphragm 5 deforms when the internal pressure of the battery container 10 increases and breaks the current path between the positive electrode external terminal 20A and the positive electrode current collector plate 30A.

The individual terminal portions 32 of the positive electrode and negative electrode current collector plates 30A and 30B are formed in a shape of a plate that extends from both sides of the base portion 31 in the thickness direction of the battery container 10 to the bottom surface 12c of the battery can 12 along a wide lateral surface 12b having a maximum area in the battery can 12. The individual terminal portions 32 of the current collector plates 30A and 30B extend from end portions of outer sides of the individual base portions 31 in the longitudinal direction of the battery lid 11, that is, the width direction of the battery container 10 and are joined to current collector plate joining portions 41d and 42d of end portions of the electrode group 40 by ultrasonic pressure welding or resistance welding, for example.

As a result, the positive electrode current collector plate 30A is disposed in one end portion of a direction of a winding axis D of the electrode group 40 and is electrically connected to a positive electrode 41 (refer to FIG. 3) of the electrode group 40. In addition, the negative electrode current collector plate 30B is disposed in the other end portion of the direction of the winding axis D and is electrically connected to a negative electrode 42 (refer to FIG. 3) of the electrode group. In addition, the current collector plate joining portions 41d and 42d are joined to the individual terminal portions 32 of the current collector plates 30A and 30B, so that the electrode group 40 is fixed on the battery lid 11 via the current collector plates 30A and 30B and the insulating members 3A and 3B. In addition, the external terminals 20A and 20B, the insulating member 2, the insulating members 3A and 3B, the current collector plates 30A and 30B, the current breaking unit 50, and the electrode group 40 are assembled in the battery lid 11 and a lid assembly 60 is configured.

When the secondary battery 100 is manufactured, the lid assembly 60 is inserted into an opening portion 12a of the battery can 12 from a bending portion 40b of a lower side of the electrode group 40, in a state in which an insulating sheet not illustrated in the drawings is disposed between the electrode group 40 and the battery can 12 to electrically insulate the electrode group 40 and the battery can 12 from each other. The electrode group 40 is accommodated in the battery can 12 such that narrow lateral surfaces 12d and 12d of the battery can 12 are located at both sides of the direction of the winding axis D and the direction of the winding axis D is almost parallel to the bottom surface 12c and the wide lateral surface 12b of the battery can 12.

As a result, the electrode group 40 is in a state in which one bending portion 40b faces the battery lid 11 and the other bending portion 40b faces the bottom surface 12c of the battery can 12 and a planar portion 40a faces the wide lateral surface 12b. In addition, entire circumference of the battery lid 11 is joined to the opening portion 12a of the battery can 12 by laser welding, for example, in a state in which the opening portion 12a of the battery can 12 is closed by the battery lid 11, so that the battery container 10 including the battery lid 11 and the battery can 12 is formed.

Then, a non-aqueous electrolyte is injected into the battery container 10 via the liquid injection hole 14 of the battery lid 11 and the liquid injection plug 15 is joined to the liquid injection hole 14 by the laser welding to seal the liquid injection hole 14, so that the battery container 10 is hermetically sealed. As an example of the non-aqueous electrolyte injected into the battery container 10, a resultant obtained by dissolving lithium hexafluorophosphate ($LiPF_6$) in a mixed solution, which is obtained by mixing ethylene carbonate with dimethyl carbonate at a volume ratio of 1:2, at a concentration of 1 mol/l can be used.

Figure 3:
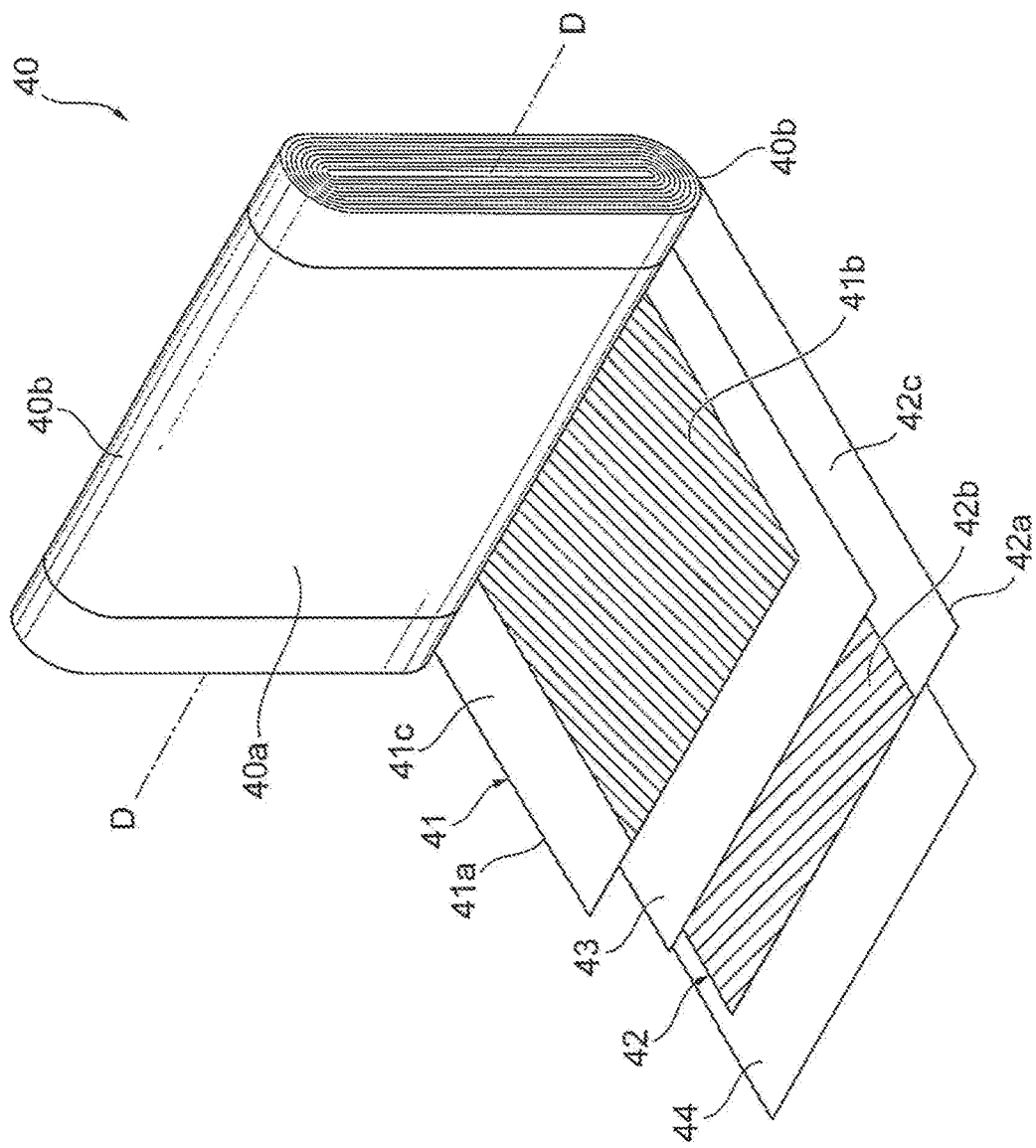
FIG. 3 is an exploded perspective view of a wound electrode group illustrated in FIG. 2.

FIG. 3 is an exploded perspective view of a part of the electrode group 40 illustrated in FIG. 2. The electrode group 40 is a wound electrode group that is formed in a flat shape by winding the positive and negative electrodes 41 and 42 stacked with separators 43 and 44 between the positive and negative electrodes 41 and 42, around a shaft center parallel to the winding axis D. The electrode group 40 has a pair of flat planar portions 40a that are disposed to face the wide lateral surface 12b of the battery can 12 and a pair of semi-cylindrical bending portions 40b that are disposed to face the battery lid 11 and the bottom surface 12c of the battery can 12. The separators 43 and 44 insulate the positive electrode 41 and the negative electrode 42 from each other and the separator 44 is wound on the outside of the negative electrode 42 wound on outermost circumference. The separators 43 and 44 are manufactured using a porous polyethylene resin, for example.

The positive electrode 41 has a positive electrode foil 41a that is a positive electrode current collector and a positive electrode mixture layer 41b that is made of a positive electrode active material mixture applied on both surfaces of the positive electrode foil 41a. One side of a width direction of the positive electrode 41 is not provided with the positive electrode mixture layer 41b and becomes a foil exposing portion 41c where the positive electrode foil 41a is exposed. The positive electrode 41 is wound around the winding axis D in a state in which the foil exposing portion 41c is disposed at a side opposite to a foil exposing portion 42c of the negative electrode 42 in the direction of the winding axis D.

The positive electrode 41 can be manufactured by applying a positive electrode active material mixture obtained by adding a conductive material, a binding agent, and a dispersing solvent to the positive electrode active material and mixing these materials on both surfaces of the positive electrode foil 41a, except for one side of the width direction, and performing drying, pressing, and cutting, for example. As an example of the positive electrode foil 41a, an aluminum foil having a thickness of about 20 μm can be used. A thickness of the positive electrode mixture layer 41b not including a thickness of the positive electrode foil 41a is about 90 μm, for example.

For a material of the positive electrode active material mixture, for example, 100 parts by weight of lithium manganate (chemical formula: $LiMn_2O_4$) can be used as the positive electrode active material, 10 parts by weight of scaly graphite can be used as the conductive material, 10 parts by weight of polyvinylidene fluoride (hereinafter, referred to as PVDF) can be used as the binding agent, and N-methyl-pyrrolidone (hereinafter, referred to as NMP) can be used as the dispersing solvent. The positive electrode active material is not limited to lithium manganate described above and other lithium manganate having a spinel crystal structure and a lithium manganese complex oxide partially substituted by or doped with metal elements may be used as examples of the positive electrode active materials. In addition, lithium cobaltate or lithium titanate having a laminar crystal structure and a lithium-metal composite oxide obtained by substitution or doping of a part thereof with metal elements may be used as the positive electrode active material.

The negative electrode 42 has a negative electrode foil 42a that is a negative electrode current collector and a negative electrode mixture layer 42b that is made of a negative electrode active material mixture applied on both surfaces of the negative electrode foil 42a. One side of a width direction of the negative electrode 42 is not provided with the negative electrode mixture layer 42b and becomes a foil exposing portion 42c where the negative electrode foil 42a is exposed. The negative electrode 42 is wound around the winding axis D in a state in which the foil exposing portion 42c thereof is disposed at a side opposite to the foil exposing portion 41c of the positive electrode 41 in the direction of the winding axis D.

The negative electrode 42 can be manufactured by applying a negative electrode active material mixture obtained by adding a binding agent and a dispersing solvent to the negative electrode active material and mixing these materials on both surfaces of the negative electrode foil 42a, except for one side of the width direction, and performing drying, pressing, and cutting. As an example of the negative electrode foil 42a, a copper foil having a thickness of about 10 μm can be used. A thickness of the negative electrode mixture layer 42b not including a thickness of the negative electrode foil 42a is about 70 μm, for example.

For a material of the negative electrode active material mixture, for example, 100 parts by weight of amorphous carbon powder can be used as the negative electrode active material, 10 parts by weight of PVDF can be used as the binding agent, and NMP can be used as the dispersing solvent. The negative electrode active material is not limited to the amorphous carbon and natural graphite allowing insertion and desorption of lithium ions, various artificial graphite materials, carbonaceous materials such as coke, a compound (for example, SiO and $TiSi_2$) such as Si and Sn, or a composite material thereof may be used. A particle shape of the negative electrode active material is not particularly limited and particle shapes such as a scaly shape, a spherical shape, a fibrous shape, and a massive shape can be appropriately selected.

Further, the binding material used for the positive electrode and negative electrode mixture layers 41b and 42b is not limited to PVDF. For example, polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various latexes, acrylonitrile, vinyl fluoride, vinylidene fluoride, propylene fluoride, chloroprene fluoride, a polymer such as an acrylic resin, and a mixture thereof may be used as the binding material.

As an example of a shaft core when the positive electrode 41 and the negative electrode 42 are wound in piles with the separators 43 and 44 between the positive electrode 41 and the negative electrode 42, a resultant obtained by winding a resin sheet having higher bending rigidity than all of the positive electrode foil 41a, the negative electrode foil 42a, and the separators 43 and 44 can be used.

In the direction of the winding axis D of the electrode group 40, a width of the negative electrode mixture layer 42b of the negative electrode 42 becomes larger than a width of the positive electrode mixture layer 41b of the positive electrode 41. In addition, the negative electrodes 42 are wound on innermost circumference and outermost circumference of the electrode group 40. As a result, the positive electrode mixture layer 41b is interposed between the negative electrode mixture layers 42b from the innermost circumference to the outermost circumference of the electrode group 40.

The foil exposing portions 41c and 42c of the positive electrode 41 and the negative electrode 42 are bundled by the planar portion 40a of the electrode group 40 and the current collector plate joining portions 41d and 42d (refer to FIG. 2) are formed. The individual current collector plate joining portions 41d and 42d of the positive electrode 41 and the negative electrode 42 are joined to the individual terminal portions 32 of the positive electrode and negative electrode current collector plates 30A and 30B by ultrasonic welding, for example. As a result, at the positive electrode side and the negative electrode side, the external terminals 20A and 20B are electrically connected to the positive and negative electrodes 41 and 42 configuring the electrode group 40 via the current collector plates 30A and 30B.

In the direction of the winding axis D of the electrode group 40, the widths of the separators 43 and 44 are larger than the width of the negative electrode mixture layer 42b. However, the foil exposing portions 41c and 42c of the positive electrode 41 and the negative electrode 42 protrude to positions closer to the outside of the width direction than the end portions of the width direction of the separators 43 and 44. Therefore, the separators 43 and 44 do not cause a trouble when the foil exposing portions 41c and 42c are bundled and welded.

Figure 4B:
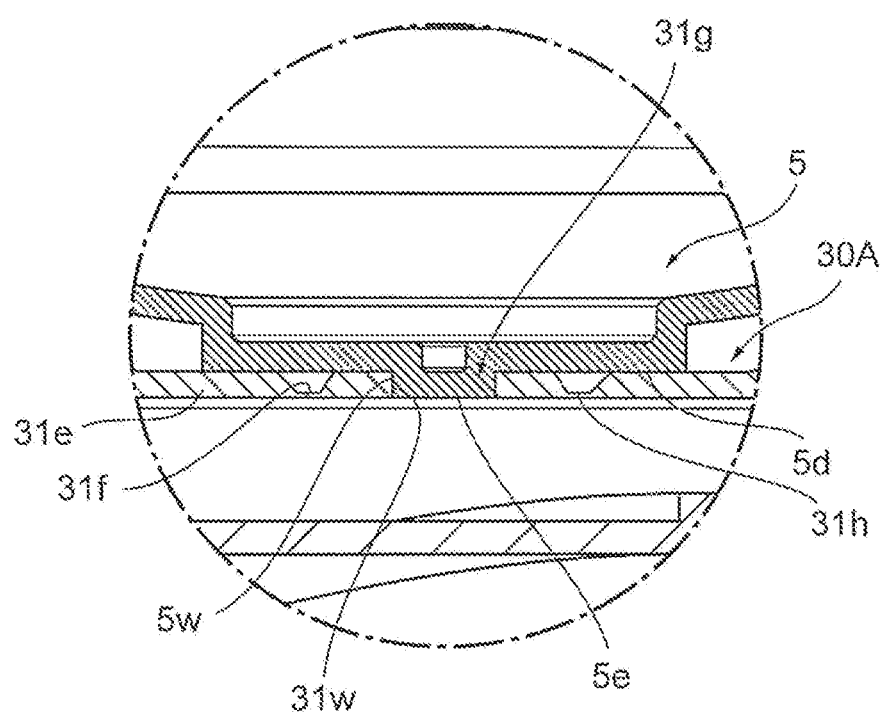
FIG. 4B is an enlarged cross-sectional view of a surrounding portion of a convex portion of a diaphragm illustrated in FIG. 4A before welding.
Figure 4C:
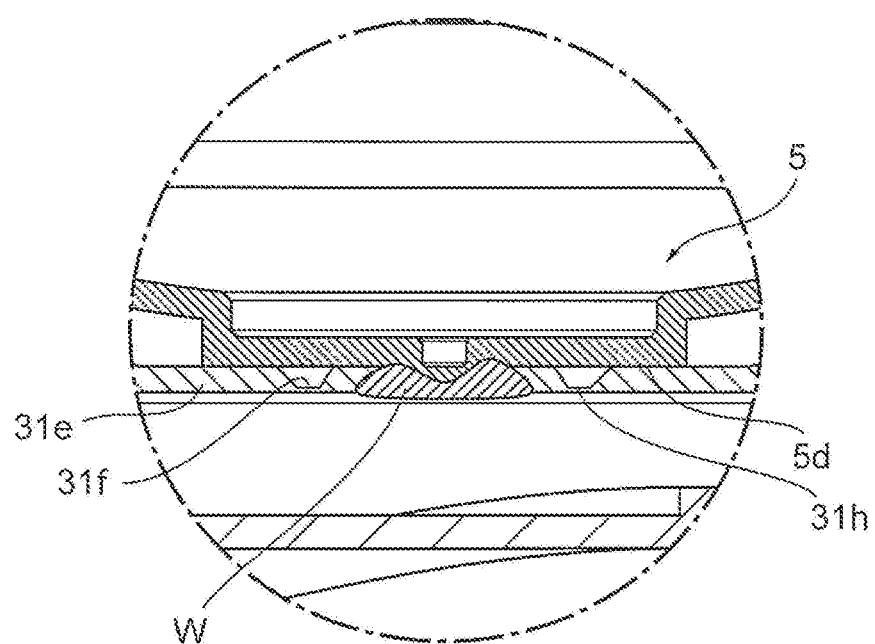
FIG. 4C is an enlarged cross-sectional view of the surrounding portion of the convex portion of the diaphragm illustrated in FIG. 4A after the welding.
Figure 5:
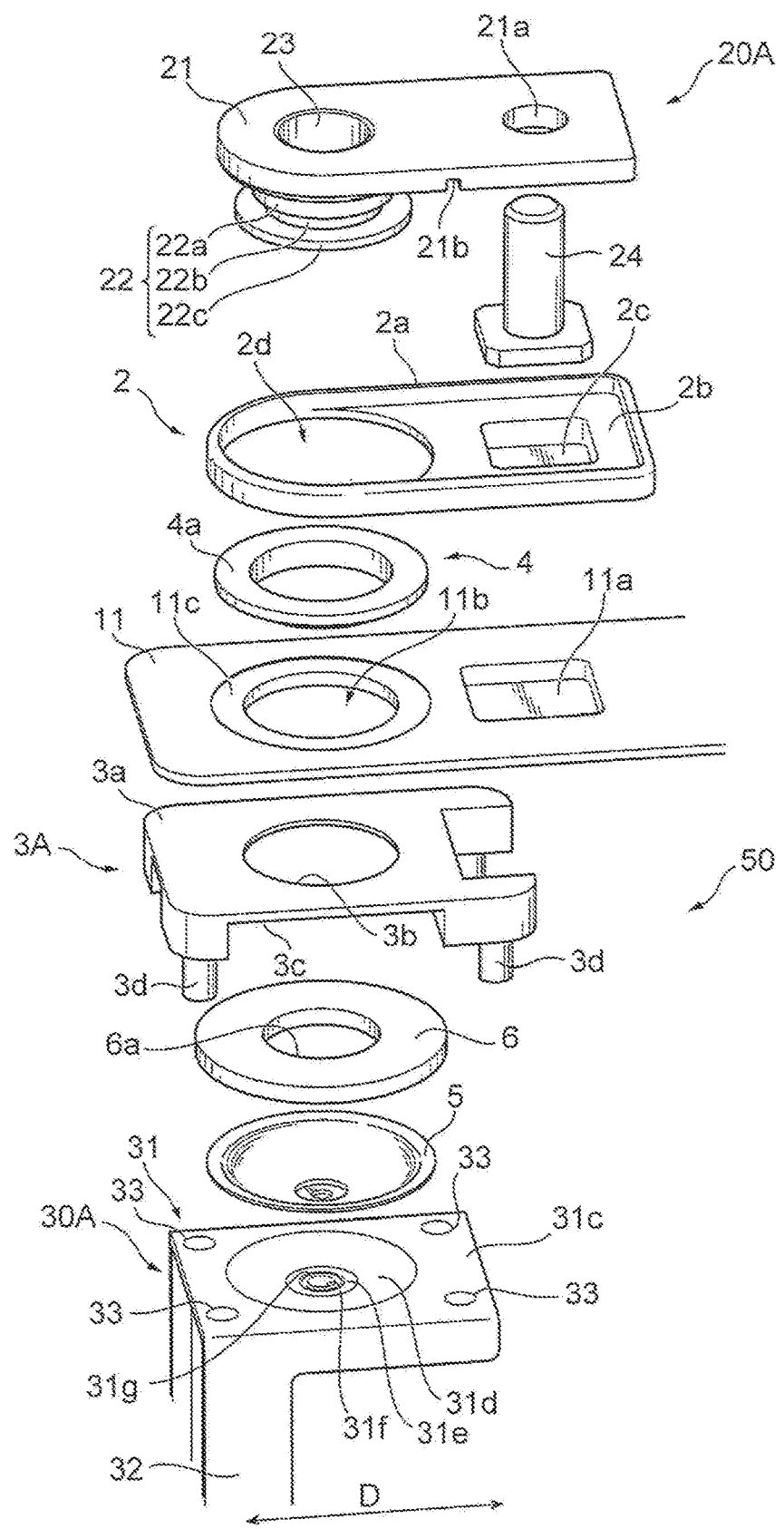
FIG. 5 is an exploded perspective view of the diaphragm illustrated in FIG. 4A and a peripheral member thereof.

FIG. 4A is an enlarged cross-sectional view of the current breaking unit 50 illustrated in FIG. 2. FIG. 4B is an enlarged cross-sectional view of a surrounding portion of a convex portion 5e of the diaphragm 5 illustrated in FIG. 4A before welding. FIG. 4C is an enlarged cross-sectional view of the surrounding portion of the convex portion 5e of the diaphragm 5 illustrated in FIG. 4A after the welding. FIG. 5 is an exploded perspective view of a peripheral member of the current breaking unit 50 illustrated in FIG. 4A. In FIG. 4A, illustration of a welding portion W (refer to FIG. 4C) to be described below is omitted. In addition, in FIG. 5, illustration of the electrode group 40 is omitted and a state before an engagement portion 3f is formed in a protrusion portion 3d of the insulating member 3A is illustrated.

The positive electrode external terminal 20A has a plate-like portion 21 extending along a longitudinal direction of the battery lid 11 on the battery lid 11, a columnar connecting portion 22 penetrating the battery lid 11 and connected to the diaphragm 5, a through-hole 23 penetrating the plate-like portion 21 and the connecting portion 22, and a bolt 24. The through-hole 23 may not be provided in the positive electrode external terminal 20A.

In the plate-like portion 21, a through-hole 21a is provided in an end portion of an inner side of the longitudinal direction of the battery lid 11, that is, the width direction of the battery container 10. The bolt 24 is inserted into the through-hole 21a from a bottom surface side to a top surface side of the plate-like portion 21. A groove portion 21b is formed in a center portion of the plate-like portion 21 in the width direction of the battery container 10 along a short direction of the battery lid 11, that is, a thickness direction of the battery container 10, so that the thickness of the plate-like portion 21 decreases partially.

The connecting portion 22 is provided in an end portion of the plate-like portion 21 located at an outer side of the width direction of the battery container 10. In a penetration direction of the battery lid 11, the connecting portion 22 has a diameter expansion portion 22a that has a diameter expanded, a diameter reduction portion 22b that has a diameter reduced, and a caulking portion 22c that has a diameter expanded by plastically deforming a leading edge of the diameter reduction portion 22b. The through-hole 23 of the external terminal 20A penetrates the external terminal 20A along an axial direction of the connecting portion 22 and is opened to the top surface of the plate-like portion 21 and a center portion of the caulking portion 22c.

The insulating member 2 of the outer side of the battery container 10 is manufactured using a resin material having an insulating property, for example, and has an edge portion 2a that covers a circumferential lateral surface of the plate-like portion 21 of the external terminal 20A and a bottom portion 2b that adheres tightly to a bottom surface of the plate-like portion 21 and the top surface of the battery lid 11. The edge portion 2a of the insulating member 2 covers the circumferential lateral surface of the plate-like portion 21 and prevents a short circuit of the plate-like portion 21 and the battery lid 11 or other member. The bottom portion 2b of the insulating member 2 is disposed between the plate-like portion 21 of the external terminal 20A and the battery lid 11 and electrically insulates these elements from each other. A convex portion 2c engaging with a concave portion 11a provided on the top surface of the battery lid 11 and an opening portion 2d to insert the connecting portion 22 of the external terminal 20A are provided in the bottom portion 2b of the insulating member 2. A head portion of the bolt 24 is accommodated in the convex portion 2c.

A gasket 4 is manufactured using a resin material having an insulating property, for example, and has a cylindrical portion 4a and a flange portion 4b provided in an end portion of the outer side of the battery container 10 in an axial direction of the cylindrical portion 4a. The cylindrical portion 4a of the gasket 4 is inserted into the through-hole 11b of the battery lid 11 in a state in which the connecting portion 22 of the external terminal 20A is inserted into the cylindrical portion 4a, is disposed between the connecting portion 22 of the external terminal 20A and an inner circumferential surface of the through-hole 11b of the battery lid 11, and electrically insulates the connecting portion 22 and the battery lid 11 from each other. The flange portion 4b of the gasket 4 is disposed in the opening portion 2d of the insulating member 2, engages with a stepped portion 11c provided around the through-hole 11b of the battery lid 11, and is compressed between the stepped portion 11c and the bottom surface of the plate-like portion 21 of the external terminal 20A. As a result, the gasket 4 adheres tightly to the stepped portion 11c having a concave shape and the bottom surface of the plate-like portion 21 and seals the through-hole 11b of the battery lid 11.

The insulating member 3A of the inner side of the battery container 10 is manufactured using a resin material having an insulating property, for example, and has a body portion 3a that extends in the width direction of the battery container 10, that is, the direction of the winding axis D of the electrode group 40 and a through-hole 3b that is provided in a center portion of an extension direction of the body portion 3a. The body portion 3a of the insulating member 3A has a concave portion 3c to dispose a conductive plate 6 and the diaphragm 5 and a plurality of protrusion portions 3d to fix the base portion 31 of the current collector plate 30A. An engagement concave portion 3e that is formed in a planar shape corresponding to a planar shape of the conductive plate 6 and engages the conductive plate 6 is provided on a surface of the concave portion 3c of the insulating member 3A facing the inner side of the battery container 10.

The plurality of protrusion portions 3d of the insulating member 3A protrude in a penetration direction of the base portion 31 of the current collector plate 30A, that is, a thickness direction of the base portion 31 and are inserted into a fixing hole 33 provided in the base portion 31 of the current collector plate 30A. The insulating member 3A including the protrusion portions 3d is formed of a thermoplastic resin material. A leading edge of the protrusion portion 3d passes through the fixing hole 33 of the base portion 31 of the current collector plate 30A and is thermally welded to the base portion 31, for example. As a result, a diameter of the leading edge of the protrusion portion 3d is expanded, the engagement portion 3f is formed, and the base portion 31 of the current collector plate 30A is fixed on the insulating member 3A. A method of fixing the base portion 31 of the current collector plate 30A on the insulating member 3A is not limited to the thermal welding of the protrusion portion 3d. When stronger joining is necessary, joining using a screw or a rivet or joining using an adhesive material can be adopted.

The current breaking unit 50 that is accommodated in the battery container 10 includes the diaphragm 5 as a main component. In addition, the current breaking unit 50 according to this embodiment includes the conductive plate 6 that is joined to a circumferential edge portion 5a of the diaphragm 5. The diaphragm 5 and the conductive plate 6 are manufactured using a conductive metal material, for example, aluminum or an aluminum alloy, similarly to the positive electrode external terminal 20A and the current collector plate 30A.

The diaphragm 5 is disposed between the battery lid 11 of the battery container 10 and the base portion 31 of the current collector plate 30A and between the conductive plate 6 and the base portion 31 of the current collector plate 30A. The diaphragm 5 according to this embodiment has a circular planar shape in a plan view perpendicular to the battery lid 11, has a convex shape bulging out toward the base portion 31 of the current collector plate 30A, and has a bowl shape having depth in a direction perpendicular to the battery lid 11. A shape of the diaphragm 5 is not limited to the circular planar shape and the convex shape as in this embodiment. For example, the diaphragm 5 may have a planar shape of an elliptical form or a racetrack form in which a dimension of the longitudinal direction of the battery lid 11 is larger than a dimension of the short direction of the battery lid 11 and may have a flat plate shape.

The conductive plate 6 is a plate-like member having a planar shape corresponding to the diaphragm 5 and has a through-hole 6a to insert the connecting portion 22 of the external terminal 20A and an annular groove 6b to engage the circumferential edge portion 5a of the diaphragm 5.

A diameter of the leading edge of the connecting portion 22 of the external terminal 20A is expanded at the side of the bottom surface 6c of the conductive plate 6 facing the base portion 31 of the current collector plate 30A, the leading edge is plastically deformed, and the caulking portion 22c is formed in the leading edge of the connecting portion 22. As a result, the caulking portion 22c and the conductive plate 6 contact each other, the external terminal 20A and the conductive plate 6 are electrically connected to each other, and the external terminal 20A, the insulating member 2, the gasket 4, the insulating member 3A, and the conductive plate 6 are fixed on the battery lid 11. In this state, the external terminal 20A and the conductive plate 6 are electrically insulated from the battery lid 11 by the insulating member 2, the gasket 4, and the insulating member 3A.

The circumferential edge portion 5a of the diaphragm 5 is bent along a direction parallel to the battery lid 11, engages with the annular groove 6b formed on the surface of the conductive plate 6 facing the inner side of the battery container 10, contacts the bottom portion of the annular groove 6b, and is joined to the conductive plate 6 over entire circumference by the laser welding. As a result, a space between the diaphragm 5 and the conductive plate 6 is isolated from an internal space of the battery container 10 and communicates with an external space of the battery container 10 by the through-hole 23 of the external terminal 20A. In the diaphragm 5, the circumferential edge portion 5a is connected to the connecting portion 22 of the external terminal 20A via the conductive plate 6.

A side wall portion 5b adjacent to the inner side of the circumferential edge portion 5a of the diaphragm 5 extends from the circumferential edge portion 5a to the bottom surface 12c of the battery can 12 along a direction perpendicular to the battery lid 11 and an angle for the direction perpendicular to the battery lid 11 is smaller than an angle for a direction parallel to the battery lid 11. A bottom wall portion 5c adjacent to the inner side of the side wall portion 5b of the diaphragm 5 extends to a center portion of the diaphragm 5 along the direction parallel to the battery lid 11 and an angle for the direction perpendicular to the battery lid 11 is larger than an angle for the direction parallel to the battery lid 11. In the bottom wall portion 5c, a surface facing the base portion 31 of the current collector plate 30A becomes a convex surface and a protrusion portion 5d is formed in a center portion.

The protrusion portion 5d protrudes from the center portion of the diaphragm 5, that is, the center portion of the bottom wall portion 5c to the base portion 31 of the current collector plate 30A and is formed in a planar shape similar to the planar shape of the diaphragm 5 in a plan view perpendicular to the battery lid 11. For example, as in this embodiment, if the planar shape of the diaphragm 5 is a circular shape, the planar shape of the protrusion portion 5d is also a circular shape. When a dimension of the diaphragm 5 in the longitudinal direction of the battery lid 11 is larger than a dimension of the diaphragm 5 in the short direction of the battery lid 11 in a plan view perpendicular to the battery lid 11, a dimension of the protrusion portion 5d in the longitudinal direction of the battery lid 11 is also larger than a dimension of the protrusion portion 5d in the short direction of the battery lid 11.

The hollow convex portion 5e that protrudes from the protrusion portion 5d to the base portion 31 of the current collector plate 30A is formed in a center portion of the protrusion portion 5d. That is, the convex portion 5e according to this embodiment is formed in a shape of a bottomed cylinder having an internal space and an opening end is connected to the protrusion portion 5d of the diaphragm 5. In this embodiment, a thickness of the convex portion 5e is equal to a thickness of the protrusion portion 5d adjacent to the convex portion 5e, the bottom wall portion 5c, and the side wall portion 5b. In addition, the thickness of the convex portion 5e is not limited to the same thickness as the thickness of the protrusion portion 5d, the bottom wall portion 5c, and the side wall portion 5b and may be smaller or larger than the thickness of the protrusion portion 5d, the bottom wall portion 5c, and the side wall portion 5b. In other words, the thickness of the convex portion 5e may be equal to or smaller than the thickness of the diaphragm 5 of a portion adjacent to the convex portion 5e and may be larger than the thickness of the diaphragm 5 of the adjacent portion.

In the base portion 31 of the current collector plate 30A, a concave portion 31d is formed on a top surface facing the diaphragm 5 and facing the outer side of the battery container 10. A method of forming the concave portion 31d is not particularly limited. For example, the concave portion 31d can be formed by press working. The concave portion 31d has an inclination surface along a convex shape of the bottom wall portion 5c of the diaphragm 5 and a flat bottom portion 31e contacting the protrusion portion 5d of the diaphragm 5. The bottom portion 31e of the concave portion 31d contacts a bottom surface of the protrusion portion 5d of the diaphragm 5. However, the bottom portion 31e of the concave portion 31d and the protrusion portion 5d are not welded.

A through-hole 31g to insert the convex portion 5e of the diaphragm 5 is provided in a center portion of the bottom portion 31e of the concave portion 31d. A thin portion 31h is provided around the through-hole 31g to surround the through-hole 31g. The thin portion 31h is a portion that is thinner than the other portion of the base portion 31 of the current collector plate 30A and fractures when the diaphragm 5 deforms due to an increase in the internal pressure of the battery container 10. In this embodiment, an annular groove 31f to surround the through-hole 31g is provided in the bottom portion 31e of the concave portion 31d, so that the thin portion 31h is provided to surround the through-hole 31g.

As illustrated in FIG. 4B, the convex portion 5e of the diaphragm 5 is inserted into the through-hole 31g of the current collector plate 30A before the diaphragm 5 and the current collector plate 30A are welded. As a result, an inner wall portion 31w of the through-hole 31g and a side wall portion 5w of the convex portion 5e are in a facing state. In this embodiment, a bottom surface of the convex portion 5e of the diaphragm 5 and a bottom surface of the base portion 31 of the current collector plate 30A are flush with each other without a step.

The convex portion 5e of the diaphragm 5 may protrude from the through-hole 31g of the current collector plate 30A. More specifically, the bottom surface of the convex portion 5e of the diaphragm 5 may be disposed at a side below the bottom surface of the current collector plate 30A, that is, the inner side of the battery container 10 or a position farther from the battery lid 11 than the bottom surface of the current collector plate 30A and a step may be formed between the bottom surface of the convex portion 5e and the bottom surface of the current collector plate 30A. In addition, the bottom surface of the convex portion 5e of the diaphragm 5 may be disposed at a side on the bottom surface of the current collector plate 30A, that is, an outer side of the battery container 10 or a position closer to the battery lid 11 than the bottom surface of the current collector plate 30A and a step may be formed between the bottom surface of the convex portion 5e and the bottom surface of the current collector plate 30A.

In any case, the convex portion 5e of the diaphragm 5 is inserted into the through-hole 31g of the current collector plate 30A, the inner wall portion 31w of the through-hole 31g and the side wall portion 5w of the convex portion 5e are caused to face each other, and the inner wall portion 31w of the through-hole 31g and the side wall portion 5w of the convex portion 5e are welded to each other. Specifically, a high energy beam such as laser light or an electron beam is radiated to the inner wall portion 31w of the through-hole 31g and the side wall portion 5w of the convex portion 5e, from a direction almost perpendicular to the base portion 31 of the current collector plate 30A.

As a result, as illustrated in FIG. 4C, the inner wall portion 31w of the through-hole 31g and the side wall portion 5w of the convex portion 5e facing each other are welded to each other. In addition, the welding portion W is formed between the diaphragm 5 and the current collector plate 30A by welding of the inner wall portion 31w of the through-hole 31g and the side wall portion 5w of the convex portion 5e. In addition, the thin portion 31h formed of the annular groove 31f surrounding the through-hole 31g is provided to surround the welding portion W. In addition, the inner wall portion 31w of the through-hole 31g and the side wall portion 5w of the convex portion 5e may be welded over entire circumference of the through-hole 31g. However, a plurality of places may be welded at intervals along a circumferential direction of the through-hole 31g, according to required joining strength.

The configuration of the positive electrode side having the current breaking unit 50 has been mainly described. However, the secondary battery 100 according to this embodiment does not have the current breaking unit 50 between the negative electrode external terminal 20B and the current collector plate 30B, as illustrated in FIGS. 1 and 2. The negative electrode external terminal 20B has the same connecting portion 22 as the connecting portion 22 of the positive electrode external terminal 20A illustrated in FIG. 4A. However, the negative electrode external terminal 20B does not have the through-hole 23. The connecting portion 22 of the negative electrode external terminal 20B passes through the through-hole of the base portion 31 of the current collector plate 30B, instead of the conductive plate 6, and the same caulking portion 22c as the caulking portion 22c of the positive electrode external terminal 20A is formed in a leading edge.

As a result, the negative electrode external terminal 20B is electrically connected to the base portion 31 of the current collector plate 30B and the external terminal 20B and the current collector plate 30B are fixed on the battery lid 11 via the insulating members 2 and 3B and the gasket 4. In this state, the negative electrode external terminal 20B and the current collector plate 30B are electrically insulated from the battery lid 11 by the insulating members 2 and 3B and the gasket 4, similarly to the positive electrode side illustrated in FIG. 4A.

Hereinafter, a function of the secondary battery 100 according to this embodiment will be described. In the secondary battery 100 according to this embodiment, the diaphragm 5 is disposed on the current path between the positive electrode external terminal 20A and the positive electrode current collector plate 30A connected to the electrode group 40 in the battery container 10 and the current breaking unit 50 to break the current path is configured.

By this configuration, the secondary battery 100 accumulates power supplied from a power supply source such as a generator in the electrode group 40 accommodated in the battery container 10 via the positive and negative external terminals 20A and 20B, the current breaking unit 50, and the positive and negative current collector plates 30A and 30B, in a steady state. In addition, the power accumulated in the electrode group 40 is supplied to an external device such as an electric motor via the positive and negative current collector plates 30A and 30B, the current breaking unit 50, and the positive and negative external terminals 20A and 20B.

If abnormality such as overcharge and an excessive temperature rise occurs in the secondary battery 100, gas may be generated in the battery container 10 and an internal pressure may increase. In this case, if the internal pressure of the battery container 10 increases to a predetermined pressure, the current breaking unit 50 disposed on the current path between the positive electrode external terminal 20A and the current collector plate 30A breaks the current path.

Specifically, the diaphragm 5 of the current breaking unit 50 is deformed to the battery lid 11 by the pressure of the gas in the battery container 10 and stress is applied to the thin portion 31h provided around the welding portion W between the diaphragm 5 and the current collector plate 30A. As a result, the thin portion 31h fractures, the diaphragm 5 and the current collector plate 30A are disconnected, and the current path between the positive electrode external terminal 20A and the current collector plate 30A is broken. Then, if the internal pressure of the battery container 10 further increases and is more than a predetermined value, the gas discharge valve 13 cleaves, discharges the gas in the battery container 10 to the outside, and decreases the internal pressure of the battery container 10.

As such, when the abnormality occurs in the secondary battery 100 and the internal pressure of the battery container 10 increases, a quality of the welding portion W between the diaphragm 5 and the current collector plate 30A is important to breaking the current path between the positive electrode external terminal 20A and the current collector plate 30A surely under a set pressure.

For example, in the non-aqueous electrolyte secondary battery according to the related art described in PTL 1, the convex portion provided in the edge portion of the hole for the connecting portion formation in the positive electrode current collector and the inversion plate are adjacent to each other in a thickness direction of the positive electrode current collector and overlap each other. However, the convex portion and the inversion plate do not face each other in a direction along the positive electrode current collector. For this reason, for example, when the laser welding is performed, the inversion plate becomes hard to melt at the time of the welding, in a portion covered with the convex portion of the positive electrode current collector. A portion in which the convex portion melts and spreads like an avalanche on the inversion plate and only a part of the inversion plate contacting the portion and melting are mixed, integrated, and welded.

In this case, both the welded members are melted and integrated, a welded portion is small with respect to an entire melting thickness, and a quality failure such as lack of welding strength and weld cracking due to contraction after melting portion solidification is easy to occur. That is, the lack of the strength or the cracking may occur in the connecting portion formed by the welding and a quality of the connecting portion may be deteriorated. In this case, the connecting portion may fracture due to a vibration or inertial force applied to the non-aqueous electrolyte secondary battery in a steady state. When the abnormality occurs, the strength of the connecting portion is not sufficient and a current breaking mechanism may not operate accurately under a previously set pressure.

Meanwhile, in the secondary battery 100 according to this embodiment, the diaphragm 5 has the convex portion 5e protruding to the current collector plate 30A, the convex portion 5e is inserted into the through-hole 31g provided in the current collector plate 30A, and the inner wall portion 31w of the through-hole 31g and the side wall portion 5w of the convex portion 5e face each other and are welded to each other. For this reason, the current collector plate 30A and the diaphragm 5 can be welded by melting the inner wall portion 31w of the through-hole 31g and the side wall portion 5w of the convex portion 5e facing each other, and then uniformly mix, solidify, and integrate them in a mutually kept state, without spreading both the melting metals.

As a result, when the current collector plate 30A and the diaphragm 5 are welded, a thickness of a portion in which both the current collector plate 30A and the diaphragm 5 are melted, mixed, solidified, and welded becomes almost the entire melting thickness, that is, the portion becomes almost the entire welding portion W. For this reason, in high energy beam welding such as laser welding in which a volume of the welding portion W formed between the diaphragm 5 and the current collector plate 30A is relatively small, welding cracking can be prevented and high welding strength can be stably obtained. Therefore, according to the secondary battery 100 according to this embodiment, a welding quality between the diaphragm 5 and the current collector plate 30A can be improved as compared with the related art.

In addition, in the secondary battery 100 according to this embodiment, the convex portion 5e of the diaphragm 5 is hollow and has an internal space. For this reason, when the diaphragm 5 is manufactured using a plate material by press working, for example, an amount of materials collected in the center portion of the diaphragm 5 can be decreased. Therefore, the diaphragm 5 can be easily manufactured, a use amount of materials can be reduced, productivity and a yield of the secondary battery 100 can be improved, and a manufacturing cost can be reduced.

When the thickness of the convex portion 5e of the diaphragm 5 is equal to or smaller than the thickness of the diaphragm 5 of the adjacent portion, an effect of reducing the use amount of materials, improving the productivity and the yield of the secondary battery 100, and reducing the manufacturing cost is more remarkable as compared with the case in which the thickness of the convex portion 5e of the diaphragm 5 is larger than the thickness of the diaphragm 5 of the adjacent portion.

Meanwhile, when the thickness of the convex portion 5e of the diaphragm 5 is larger than the thickness of the diaphragm 5 of the adjacent portion, a volume of a melting metal at the time of welding can be increased, high welding strength can be stably obtained, and a welding quality can be improved, as compared with the case in which the thickness of the convex portion 5e of the diaphragm 5 is equal to or smaller than the thickness of the diaphragm 5 of the adjacent portion.

In addition, the current collector plate 30A has the thin portion 31h fracturing due to the deformation of the diaphragm 5 and the thin portion 31h is provided to surround the welding portion W. The diaphragm 5 applies force of a direction toward the battery lid 11 to a portion surrounded with the thin portion 31*h* of the current collector plate 30A via the welding portion W, when the internal pressure of the battery container 10 is more than the predetermined value and the deformation occurs. As a result, the stress is applied to the thin portion 31*h* and the thin portion 31*h* factures. At this time, the thin portion 31*h* surrounds the welding portion W having a superior welding quality and high reliability, so that the welding portion W is prevented from fracturing previously, and the thin portion 31*h* can be fractured surely by the predetermined stress. Therefore, when the internal pressure of the battery container 10 reaches the predetermined pressure, the current path between the external terminal 20A and the current collector plate 30A can be broken surely, an erroneous operation of the current breaking unit 50 can be prevented, and reliability can be improved.

In addition, the diaphragm 5 is formed in a shape of a convex portion that is expanded toward the base portion 31 of the current collector plate 30A. For this reason, as compared with the case in which the diaphragm 5 has a shape of a flat plate, a surface area of the diaphragm 5 can be increased. When the internal pressure of the battery container 10 increases due to abnormality of the secondary battery 100, the diaphragm 5 can be easily deformed and current breaking can be performed surely under a lower pressure. In addition, as compared with the case in which the diaphragm 5 has the shape of the flat plate, mechanical strength until the internal gas pressure of the battery container 10 reaches the predetermined pressure can be improved and an erroneous operation of the diaphragm 5 can be prevented.

In addition, the diaphragm 5 has the protrusion portion 5*d* that protrudes to the base portion 31 of the current collector plate 30A and contacts the base portion 31 of the current collector plate 30A. For this reason, when the vibration or the inertial force is applied to the secondary battery 100, the diaphragm 5 can be supported by the protrusion portion 5*d* contacting the base portion 31 of the current collector plate 30A, the vibration or the inertial force applied to the welding portion W can be reduced, and the erroneous operation of the current breaking unit 50 can be prevented. In addition, the protrusion portion 5*d* is contacted with the base portion 31 of the current collector plate 30A, so that the convex portion 5*e* provided in the protrusion portion 5*d* is surely inserted into the through-hole 31*g* of the current collector plate 30A at a predetermined depth, and a welding quality between the diaphragm 5 and the current collector plate 30A can be improved.

In addition, the current collector plate 30A has the base portion 31 that is disposed to face the battery lid 11 and is provided with the through-hole 31*g* and the terminal portion 32 that extends from the base portion 31 and is connected to the electrode group 40. For this reason, the terminal portion 32 of the current collector plate 30A is connected to the electrode group 40 and the diaphragm 5 connected to the external terminal 20A is connected to the base portion 31, so that the diaphragm 5 can be disposed on the current path between the current collector plate 30A and the external terminal 20A. In addition, the diaphragm 5 that is connected to the external terminal 20A and is fixed on the battery lid 11 via the insulating member 3A can be disposed to face the base portion 31 of the current collector plate 30A. Therefore, the current path between the current collector plate 30A and the external terminal 20A can be broken by fracturing the thin portion 31*h* of the base portion 31, when the diaphragm 5 deforms.

In addition, the diaphragm 5 is disposed between the positive electrode external terminal 20A and the current collector plate 30A and is configured using aluminum or an aluminum alloy. For this reason, the diaphragm 5 can be easily deformed by reducing the strength of the diaphragm 5, as compared with the case in which a diaphragm configured using copper or a copper alloy is disposed between the negative electrode external terminal 20B and the current collector plate 30B. Therefore, the current path between the current collector plate 30A and the external terminal 20A can be broken more easily and surely. The current breaking unit 50 can be provided at the negative electrode side.

As described above, according to the secondary battery 100 according to this embodiment, the inner wall portion 31*w* of the through-hole 31*g* of the current collector plate 30A and the side wall portion 5*w* of the convex portion 5*e* of the diaphragm 5 are welded in a facing state, so that a welding quality between the diaphragm 5 and the current collector plate 30A can be improved.

Second Embodiment

Figure 6:
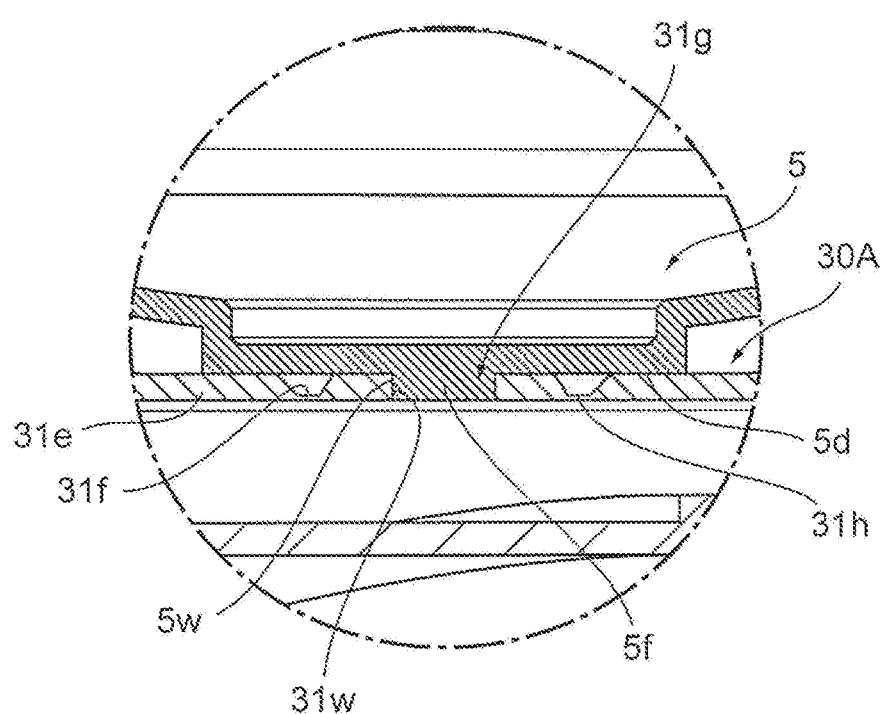
FIG. 6 is an enlarged cross-sectional view of a secondary battery according to a second embodiment of the present invention, which corresponds to FIG. 4B.

Hereinafter, a secondary battery according to a second embodiment of the present invention will be described using FIG. 6 while referring to FIGS. 1 to 5. FIG. 6 is an enlarged cross-sectional view of the secondary battery according to this embodiment, which corresponds to FIG. 4B. In FIG. 6, illustration of a welding portion W is omitted.

In the secondary battery 100 according to the first embodiment, a convex portion 5*e* of a diaphragm 5 is hollow, but in the secondary battery according to this embodiment, a convex portion 5*f* of the diaphragm 5 is solid. In this regard, the secondary battery according to this embodiment is different from the secondary battery 100 according to the first embodiment. Because the other configuration of the secondary battery according to this embodiment is the same as the configuration of the secondary battery 100 according to the first embodiment, the same portions are denoted with the same reference numerals and description thereof is omitted.

In the secondary battery according to this embodiment, when the diaphragm 5 is formed by press working of a plate material, a material of a circumferential edge portion is caused to be closer to a center portion, so that the solid convex portion 5*f* clogged with a material without having an internal space is formed. According to the secondary battery according to this embodiment, the same effect as the secondary battery 100 according to the first embodiment is obtained. In addition, because the convex portion 5*f* of the diaphragm 5 is solid, a volume of a melting metal at the time of welding can be increased as compared with the case in which the convex portion 5*e* of the diaphragm 5 is hollow.

As a result, a welding mark by laser welding is prevented from being formed as a hole penetrating the convex portion 5*f*. In addition, even though a gap is generated between an inner wall portion 31*w* of a through-hole 31*g* of a current collector plate 30A and a side wall portion 5*w* of the convex portion 5*f* of the diaphragm 5 facing the inner wall portion 31*w*, the gap can be buried with the increased melting metal, a decrease in the welding strength can be prevented, and welding cracking can be prevented. Therefore, according to the secondary battery according to this embodiment, high welding strength can be obtained stably between the diaphragm 5 and the current collector plate 30A and a welding quality can be improved.

In this embodiment, preferably, a lower end of the convex portion 5*f* is flush with a bottom surface of the current collector plate 30A without a step or protrudes to a portion below the bottom surface of the current collector plate 30A, from a viewpoint of increasing the volume of the melting metal.

Third Embodiment

Figure 7:
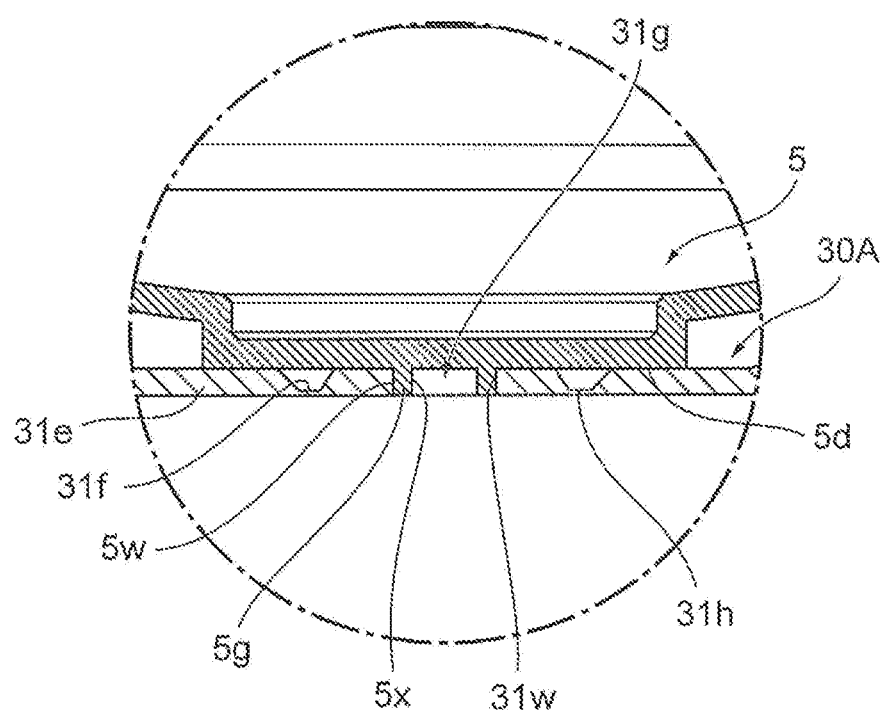
FIG. 7 is an enlarged cross-sectional view of a secondary battery according to a third embodiment of the present invention, which corresponds to FIG. 4B.

Hereinafter, a secondary battery according to a third embodiment of the present invention will be described using FIG. 7 while referring to FIGS. 1 to 5. FIG. 7 is an enlarged cross-sectional view of the secondary battery according to this embodiment, which corresponds to FIG. 4B. In FIG. 7, illustration of a welding portion W is omitted.

In the secondary battery 100 according to the first embodiment, a convex portion 5e of a diaphragm 5 has a bottomed cylindrical shape, but in the secondary battery according to this embodiment, a convex portion 5g of the diaphragm 5 has a rib shape. In this regard, the secondary battery according to this embodiment is different from the secondary battery 100 according to the first embodiment. Because the other configuration of the secondary battery according to this embodiment is the same as the configuration of the secondary battery 100 according to the first embodiment, the same portions are denoted with the same reference numerals and description thereof is omitted.

In the secondary battery according to this embodiment, the convex portion 5g of the diaphragm 5 has an inner side wall portion 5x facing an inner side of a through-hole 31g at a side opposite to a side wall portion 5w and is formed in a shape of a rib extending along a circumferential direction of the through-hole 31g. For example, the convex portion 5g can be formed in a shape of a hollow cylinder continuous over entire circumference of the through-hole 31g. In addition, a plurality of circular arc-shaped convex portions 5g along an inner wall portion 31w may be provided at intervals in the circumferential direction of the through-hole 31g. In this case, the convex portions 5g are formed in a shape of a plurality of solid ribs not having an internal space. In this case, a plurality of through-holes 31g corresponding to the plurality of convex portions 5g may be provided.

In the secondary battery according to this embodiment, when the inner wall portion 31w of the through-hole 31g and the side wall portion 5w of the convex portion 5g are welded, the convex portion 5g can be melted over an entire thickness from the side wall portion 5w to the inner side wall portion 5x. As a result, when a melting metal is solidified and contracted, the melting metal can be freely contracted to the inner wall portion 31w of the through-hole 31g without receiving force disturbing contraction from the inner side wall portion 5x.

Therefore, according to the secondary battery according to this embodiment, as compared with the case in which a part of the inner wall portion 31w of the through-hole 31g and a part of the convex portion 5g facing each other are melted, residual stress of the welding portion W can be reduced, welding cracking can be prevented, and a welding quality can be improved.

In addition, the plurality of circular arc-shaped convex portions 5g along the inner wall portion 31w are provided at intervals in the circumferential direction of the through-hole 31g, so that a welding length of each convex portion 5g is shortened, and a welding quality can be improved. Even when the convex portion 5g is formed in the shape of the hollow cylinder continuous over the entire circumference of the through-hole 31g, welding is performed at a plurality of places at intervals in the circumferential direction, so that each welding length is shortened, and the welding quality can be improved.

Fourth Embodiment

Figure 8A:
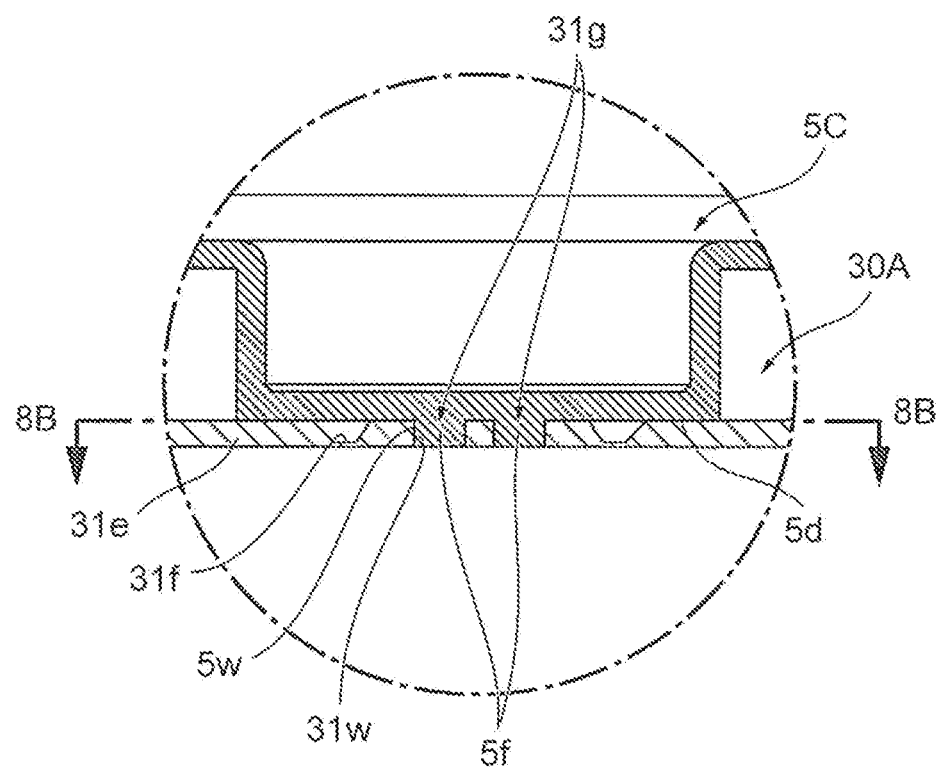
FIG. 8A is an enlarged cross-sectional view of a secondary battery according to a fourth embodiment of the present invention, which corresponds to FIG. 4B.
Figure 8B:
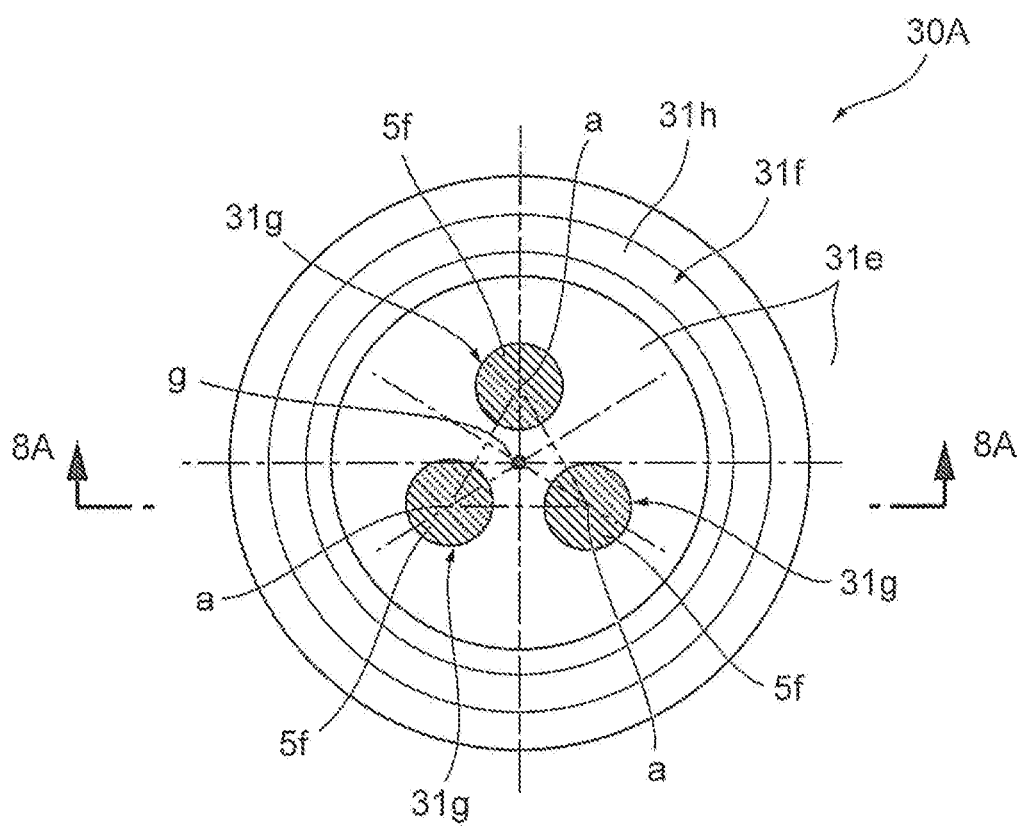
FIG. 8B is an enlarged cross-sectional view taken along the line 8B-8B illustrated in FIG. 8A.

Hereinafter, a secondary battery according to a fourth embodiment of the present invention will be described using FIGS. 8A and 8B while referring to FIGS. 1 to 5. FIG. 8A is an enlarged cross-sectional view of the secondary battery according to this embodiment, which corresponds to FIG. 4B. FIG. 8B is a cross-sectional view taken along the line 8B-8B illustrated in FIG. 8A. FIG. 8A is a cross-sectional view taken along the line 8A-8A illustrated in FIG. 8B. In addition, in FIGS. 8A and 8B, illustration of a welding portion W is omitted.

The secondary battery according to this embodiment is different from the secondary battery according to the second embodiment illustrated in FIG. 6 in that a diaphragm 5 includes a plurality of solid convex portions 5f and a current collector plate 30A includes a plurality of through-holes 31g. Because the other configuration of the secondary battery according to this embodiment is the same as the configuration of the secondary battery according to the second embodiment, the same portions are denoted with the same reference numerals and description thereof is omitted.

The convex portion 5f of the diaphragm 5 is a columnar portion that has a circular cross-section and protrudes from a protrusion portion 5d of the diaphragm 5 to the current collector plate 30A. The plurality of through-holes 31g of the current collector plate 30A are formed in a circular shape corresponding to a cross-sectional shape of the protrusion portion 5d, in a plan view perpendicular to a battery lid 11, as illustrated in FIG. 8B. A cross-sectional shape of the convex portion 5f and a shape of the through-hole 31g are not limited to the circular shape and may be a polygonal shape, an elliptical shape, and an oval shape.

For example, when the number of through-holes 31g of the current collector plate 30A is three or more, the through-holes 31g are preferably disposed at positions around individual apexes of a regular polygon. In this embodiment, the three through-holes 31g are disposed at positions centering at apexes a of a regular triangle. In this case, a thin portion 31h of the current collector plate 30A is preferably formed of an annular groove 31f centering at a gravity center of the regular polygon. In this embodiment, the thin portion 31h is formed of the circular annular groove 31f centering at a gravity center g of the regular triangle.

According to the secondary battery according to this embodiment, the diaphragm 5 includes the plurality of convex portions 5f and inner wall portions 31w of the through-hole 31g and side wall portions 5w of the convex portions 5f are welded at a plurality of places, so that joining strength of the diaphragm 5 and the current collector plate 30A can be improved. In addition, a dimension of the convex portion 5f is set to be smaller than a dimension of the convex portion 5e according to the first embodiment and a welding length in each convex portion 5f is shortened, so that a welding quality can be improved.

In addition, the current collector plate 30A includes the plurality of through-holes 31g, the convex portions 5f are inserted into the individual through-holes 31g, and a sum of welding lengths of the inner wall portions 31w of the through-holes 31g and the side wall portions 5w of the convex portions 5f are increased, so that joining strength can be improved. In addition, a diameter of the through-hole 31g is set to be smaller than a diameter of the through-hole 31g according to the first embodiment and each welding length is shortened, so that a welding quality can be improved.

In addition, the plurality of through-holes 31g are disposed at the positions centering at the individual apexes a of the regular polygon and the thin portion 31h is formed of the annular groove 31f centering at the gravity center g of the regular polygon. For this reason, when the diaphragm 5 deforms, force is applied more uniformly to an inner portion of the annular groove 31f of the current collector plate 30A via the welding portion W between the plurality of through-holes 31g and the plurality of convex portions 5f, so that stress can be applied more uniformly to the thin portion 31h. As a result, unbalanced force from the diaphragm 5 is prevented from being applied to the inner portion of the annular groove 31f of the current collector plate 30A and the thin portion 31h is prevented from being fractured under an internal pressure lower or higher than a setting pressure of a current breaking unit 50, so that the thin portion 31h can be accurately fractured under the set internal pressure. Therefore, reliability and precision of current breaking by the diaphragm 5 can be improved.

Finally, modifications of this embodiment will be described.

First Modification

Figure 9A:
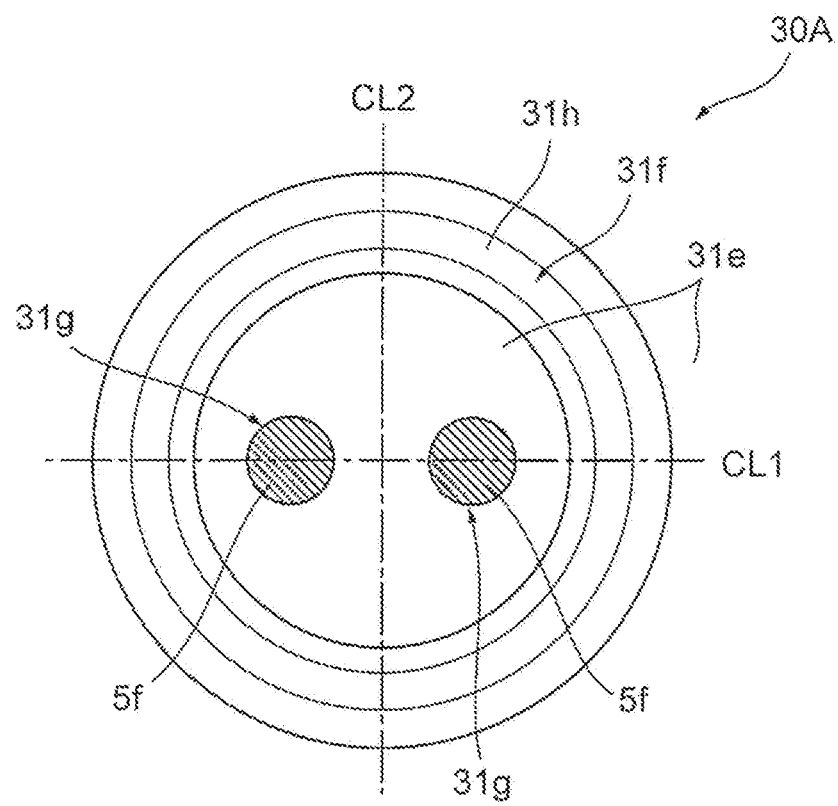
FIG. 9A is an enlarged cross-sectional view illustrating a first modification of the secondary battery according to the fourth embodiment, which corresponds to FIG. 8B.

FIG. 9A is a cross-sectional view illustrating a first modification of the secondary battery according to the fourth embodiment, which corresponds to FIG. 8B. In the secondary battery according to the fourth embodiment, the example of the case in which the three convex portions 5f and the three through-holes 31g are included is illustrated. However, in a secondary battery according to this modification, the case in which the two convex portions 5f and the two through-holes 31g are included is illustrated. In this case, the convex portions 5f and the through-holes 31g can be disposed uniformly on a center line CL1 of the annular groove 31f along the longitudinal direction of the battery lid 11 or a center line CL2 of the annular groove 31f along the short direction of the battery lid 11, for example. As a result, similarly to the secondary battery according to the fourth embodiment, when the diaphragm 5 deforms, uniform stress is applied to the thin portion 31h, so that reliability and precision of current breaking by the diaphragm 5 can be improved.

Second Modification

Figure 9B:
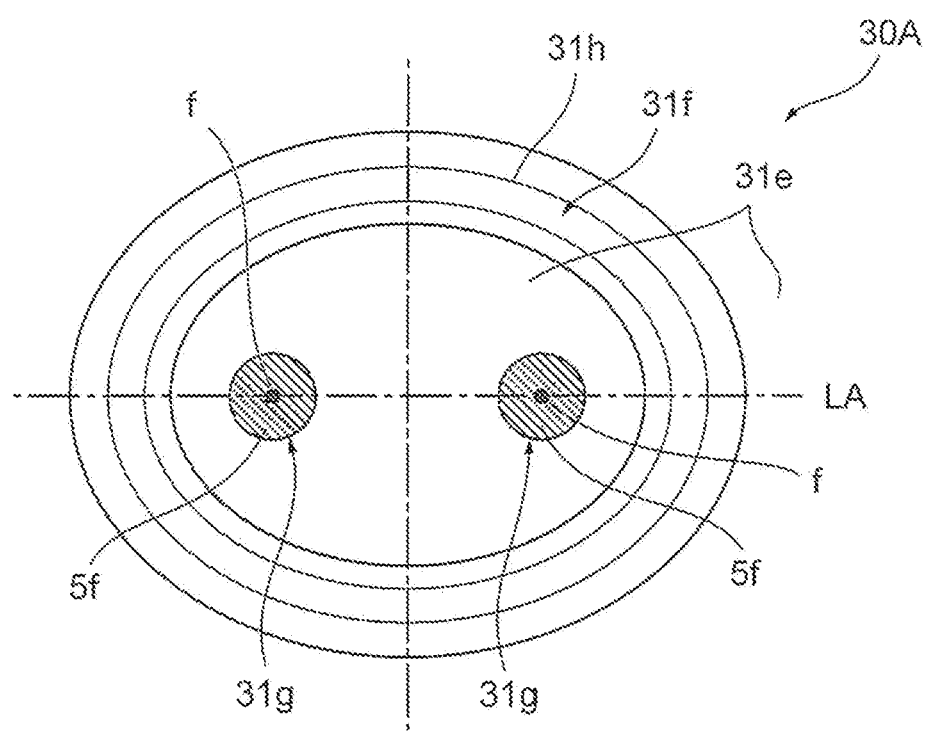
FIG. 9B is an enlarged cross-sectional view illustrating a second modification of the secondary battery according to the fourth embodiment, which corresponds to FIG. 8B.

FIG. 9B is a cross-sectional view illustrating a second modification of the secondary battery according to the fourth embodiment, which corresponds to FIG. 8B. In the secondary battery according to the first modification, the example of the case in which the annular groove 31f is circular is illustrated. However, in a secondary battery according to this modification, the annular groove 31f is elliptical. The through-holes 31g are provided at positions centering at focal points f of the annular groove 31f. Even in this modification, similarly to the secondary battery according to the fourth embodiment, when the diaphragm 5 deforms, uniform stress is applied to the thin portion 31h, so that reliability and precision of current breaking by the diaphragm 5 can be improved.

As described above, a shape of the diaphragm 5 is not limited to a circular shape in a plan view perpendicular to the battery lid 11 and the diaphragm 5 may be formed in an elliptical shape in which a long axis is parallel to the longitudinal direction of the battery lid 11, for example. In this case, a long axis LA of the elliptical annular groove 31f is preferably parallel to the longitudinal direction of the battery lid 11. As a result, when the diaphragm 5 deforms, a surface area of the diaphragm 5 is large, the welding portion W is disposed at positions of both sides of the longitudinal direction of the battery lid 11 capable of applying stronger force, and the thin portion 31h can be easily fractured. In this case, the protrusion portion 5d of the diaphragm 5 is also preferably formed in an elliptical shape in which a long axis is parallel to the longitudinal direction of the battery lid 11, from a viewpoint of facilitating the deformation of the diaphragm 5.

Third Modification

FIG. 9C is a cross-sectional view illustrating a third modification of the secondary battery according to the fourth embodiment, which corresponds to FIG. 8B. In the secondary battery according to the second modification, the example of the case in which the annular groove 31f is elliptical is illustrated. However, in a secondary battery according to this modification, the annular groove 31f has a field track shape in which semicircular or circular arc-shaped portions of both ends of the longitudinal direction are continuous by a linear portion. In addition, the through-holes 31g are provided at positions of centers c and c of the semi-circular or circular arc-shaped portions of the annular groove 31f and an intermediate position of the centers c and c. Even in this modification, similarly to the secondary battery according to the fourth embodiment, when the diaphragm 5 deforms, the uniform stress is applied to the thin portion 31h, so that reliability and precision of current breaking by the diaphragm 5 can be improved.

As described above, a shape of the diaphragm 5 is not limited to a circular shape or an elliptical shape in a plan view perpendicular to the battery lid 11 and the diaphragm 5 may be formed in a field track shape in which a long axis is parallel to the longitudinal direction of the battery lid 11, for example. In this case, a long axis LA of the annular groove 31f of the field track shape is also preferably parallel to the longitudinal direction of the battery lid 11. As a result, when the diaphragm 5 deforms, a surface area of the diaphragm 5 is large, the welding portion W is disposed at positions of both sides of the longitudinal direction of the battery lid 11 capable of applying stronger force, and the thin portion 31h can be easily fractured. In this case, the protrusion portion 5d of the diaphragm 5 is also preferably formed in a field track shape in which a long axis is parallel to the longitudinal direction of the battery lid 11, from a viewpoint of facilitating the deformation of the diaphragm 5.

The preferred embodiments of the present invention have been described. However, the present invention is not limited to the embodiments described above and various modifications are included in the present invention. The embodiments are described in detail to facilitate understanding of the present invention and the present invention is not limited to embodiments in which all of the described configurations are included.

REFERENCE SIGNS LIST 5 diaphragm, 5e, 5f, 5g convex portion, 5w side wall portion, 5x inner side wall portion, 10 battery container, 11 battery lid, 12 battery can, 20A external terminal, 30A current collector plate, 31 base portion, 31f annular groove, 31g through-hole, 31h thin portion, 31w inner wall portion, 32 terminal portion, 40 electrode group (wound electrode group), 100 secondary battery, c center, CL1 center line, f focal point, g gravity center, W welding portion

The invention claimed is:

1. A secondary battery including a diaphragm, which is disposed on a current path between a current collector plate connected to a wound electrode group in a battery container and an external terminal, that deforms when an internal pressure of the battery container increases, and breaks the current path,
- wherein the diaphragm has a convex portion with a stepped structure which protrudes to the current collector plate,
- the current collector plate has a through-hole into which the convex portion is inserted, and
- an inner wall portion of the through-hole, which faces a center of the through-hole, and a side wall portion of the convex portion, which faces the inner wall portion, are welded to each other.

2. The secondary battery according to claim 1, wherein a welding portion is formed between the diaphragm and the current collector plate by welding the inner wall portion and the side wall portion.

3. The secondary battery according to claim 2, wherein the convex portion is hollow.

4. The secondary battery according to claim 2, wherein the convex portion is formed in a shape of a rib having an inner side wall portion facing an inner side of the through-hole at a side opposite to the side wall portion and extends along a circumferential direction of the through-hole.

5. The secondary battery according to claim 3, wherein a thickness of the convex portion is equal to or smaller than a thickness of the diaphragm of a portion adjacent to the convex portion.

6. The secondary battery according to claim 3, wherein a thickness of the convex portion is larger than a thickness of the diaphragm of a portion adjacent to the convex portion.

7. The secondary battery according to claim 2, wherein the convex portion is solid.

8. The secondary battery according to claim 4, wherein the diaphragm includes a plurality of the convex portions.

9. The secondary battery according to claim 8, wherein the current collector plate includes a plurality of the through-holes.

10. The secondary battery according to claim 9, wherein the current collector plate has a thin portion which surrounds the welding portion and is fractured by deformation of the diaphragm.

11. The secondary battery according to claim 10, wherein the plurality of through-holes are disposed at positions centering at individual apexes of a regular polygon, respectively, and
the thin portion is formed of an annular groove centering at a gravity center of the regular polygon.

12. The secondary battery according to claim 10, wherein the battery container includes a flat rectangular battery can which accommodates the flat wound electrode group and a rectangular battery lid which seals the battery can,
the diaphragm has a dimension of a longitudinal direction of the battery lid larger than a dimension of a short direction of the battery lid,
the thin portion is formed of an annular groove surrounding the plurality of through-holes, and
the plurality of through-holes are provided on a center line of the annular groove along the longitudinal direction.

13. The secondary battery according to claim 12, wherein the annular groove is elliptical, and
the through-holes are provided at positions of focal points of the annular groove.

14. The secondary battery according to claim 12, wherein the annular groove has a field track shape in which circular arc-shaped portions of both ends of the longitudinal direction are continuous by a linear portion, and
the through-holes are provided at center positions of the circular arc-shaped portions.

15. The secondary battery according to claim 12, wherein the current collector plate has a base portion which is disposed to face the battery lid and is provided with the through-holes and a terminal portion which extends from the base portion and is connected to the wound electrode group.

16. The secondary battery according to claim 1, wherein the inner wall portion of the through-hole and the side wall portion of the convex portion face each other in a horizontal direction.

* * * * *